Patented July 5, 1932

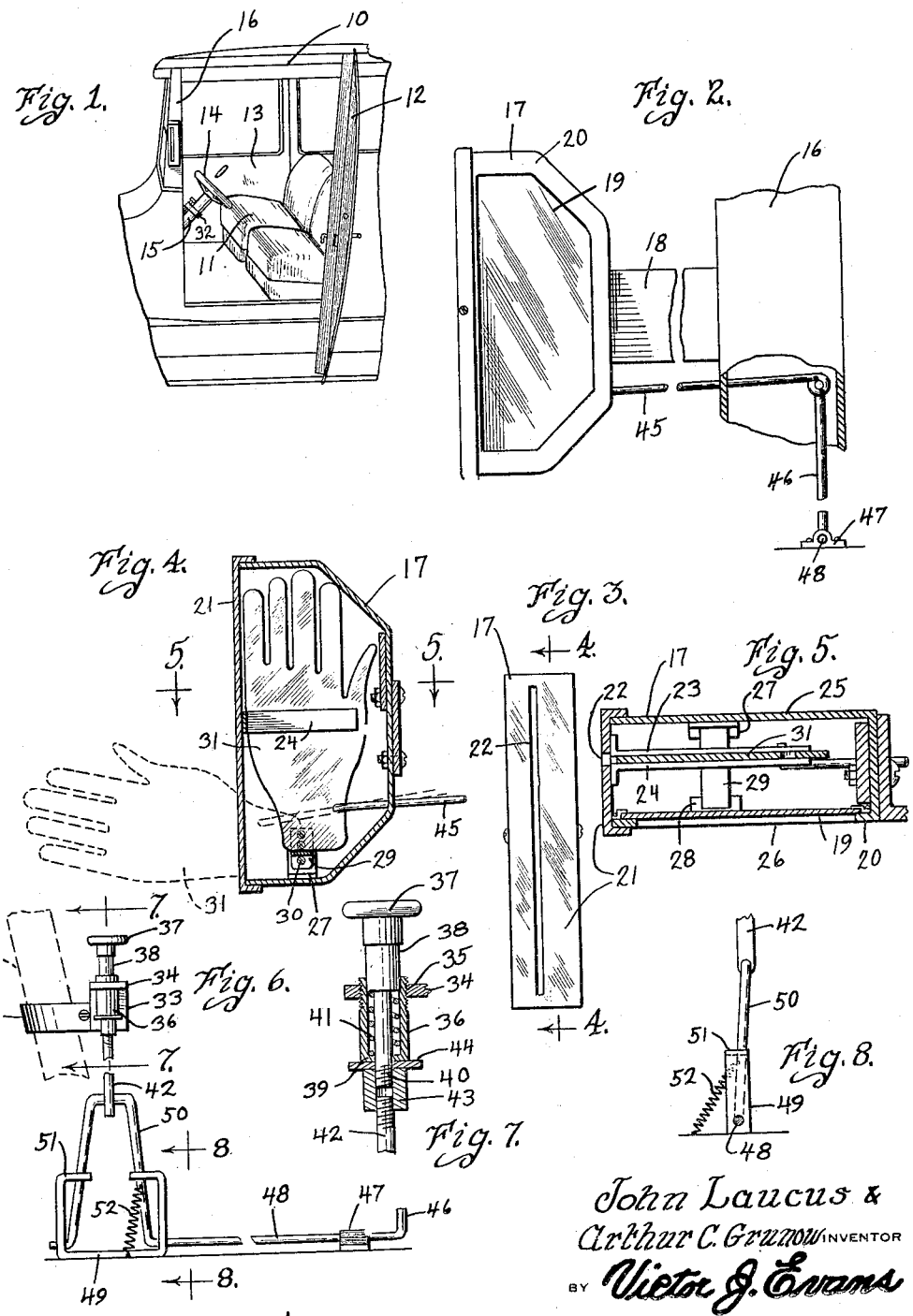

1,866,411

UNITED STATES PATENT OFFICE

JOHN LAUCUS AND ARTHUR C. GRUNOW, OF CHICAGO, ILLINOIS; SAID GRUNOW ASSIGNOR TO HENRY P. WRAY, OF CHICAGO, ILLINOIS

INDICATING SIGNAL DEVICE

Application filed December 4, 1929. Serial No. 411,582.

This invention relates to certain novel improvements in indicating signal devices and has for its principal object the provision of an improved construction of this character which will be highly efficient in use and economical in manufacture.

The salient object of our invention is to provide a signal device which may be associated with a vehicle to indicate the intentions of the operator of the vehicle.

Another object of the invention is to provide a device of the above described character which will include an operating arrangement that may be located in a position so that it will be readily accessible to the operator of the vehicle.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a perspective view depicting an automotive vehicle with which a preferred form of construction for our invention has been associated;

Fig. 2 is an elevational view depicting our invention in association with a portion of the device depicted in Fig. 1;

Fig. 3 is an elevational view of the device as depicted in Fig. 2, looking in at the left hand side of said Fig. 2;

Fig. 4 is a sectional view taken substantially on the line 4—4 on Fig. 3;

Fig. 5 is a sectional view taken substantially on the line 5—5 on Fig. 4;

Fig. 6 is an elevational view of the operating mechanisms;

Fig. 7 is a sectional view taken substantially on the lines 7—7 on Fig. 6; and

Fig. 8 is a detailed view taken substantially on the line 8—8 on Fig. 6.

In the accompanying drawing wherein we have illustrated the preferred form of construction of our invention, 10 indicates an automotive vehicle having the usual seat construction 11 associated therewith. The vehicle 10 also includes the usual doors 12 and 13. A steering wheel 14 is provided which is mounted on the so-called steering column 15. At the forward end of the body of the vehicle 10 post constructions such as 16 are provided and our improved indicating signal is mounted on one of these post constructions, preferably the one on the left hand side of the machine adjacent the steering wheel 14.

Our improved device includes a main housing 17 that is supported from the post 16 by a bracket 18. The bracket 18 is suitably secured to both post 16 and the housing 17. On the side of the housing 17 disposed toward the rear of the vehicle 10, we arrange a mirror 19 that is retained in position by a bezel construction 20. This mirror 19 permits the operator of the vehicle to view the road to the rear of the vehicle and is known in the art as a rear vision mirror.

In the wall 21 of the housing 17 disposed beside the wall to which the bracket 18 is secured, we provide a slot 22 interiorly of the housing 17 and extending transversely there across are brackets 23 and 24. The brackets 23 and 24 are substantially L-shaped and have the foot portions thereof secured to the wall 21 in such a manner that the stem portions thereof will extend parallel to each other with the justaposed faces in alignment with the edges of the slot 22. On the lower wall of the housing 17 adjacent the walls 25 and 26 brackets 27 and 28 are secured. A substantially U-shaped member 29, having an elongated bight portion has the stem portions thereof pivotally connected to the brackets 27 and 28 as indicated at 30. Mounted on the bight portion of the U-shaped member 29 is a member 31 that is preferably formed to be of a shape similar to a hand. This member 31 is disposed between the stem portions of the brackets 23 and 24. Inasmuch as the member 29 is pivotally supported and since the member 31 is secured thereto, it is manifest that this member 31 will be movable between the stem portions of the member 23 and 24 and through the opening 22. Under normal conditions the member 31 is retained in the full line position of Fig. 4 but may be moved as above stated into the dotted line position of this figure.

The means for operating the member 31 include the following mechanisms. A suitable clamping device 32 is mounted on the steering column 15 in a position substantially similar to that illustrated in Fig. 1. This clamping construction includes a bracket member 33 having a foot portion 34. In a tapped opening 35 in this foot portion 34 the screw threaded end of the sleeve 36 is fixed. A finger engaging member 37 is provided which includes a cylindrical portion 38 that is extended into the upper end of the sleeve 36. The lower end of the sleeve 36 is extended inwardly as indicated at 39 to provide a shoulder. The stem 40 is fixed to the end of the cylindrical portion 38 and extends through the sleeve 36 beyond the shoulder 39. A coil spring 41 is disposed around the stem 40 between the shoulder 39 and the end of the cylindrical member 38 and this spring 41 normally urges the cylindrical portion 38 away from the sleeve 36. The connecting link 42 is provided which is connected to the lower end of the stem 40 by a connecting member 43. A washer 44 is arranged at the upper end of the connecting member 43 and engagement of this washer 44 with the lower end of the sleeve 36 limits the action of the spring 41.

A connecting link 45 is pivotally connected to the member 31 adjacent the lower end thereof and extends out through the opening in the housing 17 and into the post 16. An operating rod 46 is extended through the post 16 and is pivotally connected to the adjacent end of the operating link 45. If desired the operating link 45 and the operating rod 46 may be disposed exteriorly of the post 16.

At a suitable point on the chassis of the vehicle 10, a bearing construction 47 is provided. A portion 48 of the operating rod 46 extends at right angles to the portion connected to the operating link 45 and this portion 48 is extended through the bearing 47. A bracket 49 is secured to the chassis and a section of the portion 48 is extended through the opening in one arm of the bracket 49. A U-shaped portion 50 is provided in the portion 48 which extends above the upper end of the arms of the bracket 49. The other end of the portion 48 is journaled in an opening in the other arm of the bracket 49. The arms of the U-shaped portion 50 are urged into recesses in the foot portions 51 of the bracket 49 by a suitable spring 52. It is the action of this spring 52 that retains the member 31 in the full line position of Fig. 4. The lower end of the connecting link 42 is pivotally connected to the bight portion of the portion 50.

When it is desired to operate the device the finger portion 37 is moved downwardly which manifestly moves the connecting link 42 downwardly, and this causes the U-shaped portion 50 to be moved downwardly against the action of the spring 52. Downward movement of the U-shaped portion 50 is transmitted through portion 48 of the rod 46 to the portion of said rod connected to the connecting link 45. This portion of the operating rod 46 will be moved toward the left as viewed in Fig. 2 and therefore the member 31 will be moved out through slot 32 into the dotted line position of Fig. 4. When the finger engaging portion 37 is released the springs 52 and 41 return the parts to normal position. If desired the member 31 may be brightly colored to attract attention thereto.

If desired a visible signal such as a light structure may be associated with the signal device previously described which light structure may be operated independently or simultaneously with the member 31.

While we have illustrated and described the preferred form of construction for carrying our invention into effect, this is capable of variation and modification, without departing from the spirit of the invention. We, therefore, do not wish to be limited to the precise details of construction set forth, but desire to avail ourselves of such variations and modifications as come within the scope of the appended claim.

Having thus described our invention what we claim as new and desire to protect by Letters Patent is:

A signal device for automotive vehicles comprising, a clamping member adapted to be mounted on the steering column of the vehicle, a spring actuated plunger mounted in said clamping member including a portion providing a handle, a substantially U-shaped member connected to said plunger, a bracket having recesses therein adapted to receive the arms of said U-shaped member, a spring having one end thereof connected to said U-shaped member, a rod member integral with one arm of said U-shaped member and rotatably mounted on the chassis of the vehicle, and means including links adapted to provide pivotal connection between said rod and an indicating member, said spring normally acting to retain said indicating member in non-signalling position, whereby said spring actuated plunger may be manually depressed by the driver of the vehicle to depress said U-shaped member against said spring whereby said rod and said links may be actuated to move said indicating member into signalling position.

In testimony whereof we affix our signatures.

JOHN LAUCUS.
ARTHUR C. GRUNOW.